UNITED STATES PATENT OFFICE.

ALBERT L. CLAPP, OF DANVERS, MASSACHUSETTS, ASSIGNOR TO THE FLINTKOTE COMPANY, OF BOSTON, MASSACHUSETTS, A CORPORATION OF MASSACHUSETTS.

FLEXIBLE PLASTIC COMPOSITION.

1,379,590.   Specification of Letters Patent.   Patented May 24, 1921.

No Drawing.   Application filed June 23, 1920. Serial No. 391,164.

*To all whom it may concern:*

Be it known that I, ALBERT L. CLAPP, a citizen of the United States, residing at Danvers, in the county of Essex and State of Massachusetts, have invented new and useful Improvements in Flexible Plastic Compositions, of which the following is a specification.

This invention has for its object to provide a composition of matter which is waterproof, pliable, tough and more or less plastic in its final form, and which is capable of a variety of uses in the arts.

The composition comprises asphalt, Portland cement, clay and a fibrous material, compounded in such manner as to impart to the final product the characteristics mentioned. For the purpose, I prefer an asphalt, or equivalent pitch or bitumen, which is hard at ordinary temperatures and which has a melting point of approximately, say, 220°–240° F. As the fibrous material, I may use fine sawdust or wood flour, or such fibers as cotton or asbestos.

In compounding my material, I form two mixtures, viz one consisting of asphalt and Portland cement, and the other consisting of clay, Portland cement and sufficient water to convert them into a paste. These two bodies are thoroughly mixed and to the mixture is added either fine sawdust or wood flour or else cotton fiber or both.

The procedure is as follows:—600 parts by weight of asphalt are heated to a temperature of, say, 250°–260° F. to melt it and render it liquid, and then 300 parts of dry Portland cement are gradually stirred into the mass to form a practically physically homogeneous mixture. A second body of material is prepared by adding sufficient water to 50 parts of fine clay and 50 parts of Portland cement to produce a thin paste, and this body is warmed to about 140° F. and is gradually added to and stirred in the asphalt mixture, which is maintained in its heated condition. After this has been accomplished, I add 400 parts of an inert fibrous material, e. g., cotton "linters," finely divided sawdust, capable of passing through an 80-mesh sieve, asbestos fiber or the like. Preferably I use 300 parts of cotton fiber and 100 parts of sawdust or of wood flour.

This material may be now rolled into sheet form, and, on cooling and setting, it is pliable or flexible, non-sticky to the touch (though it may be rendered adhesive on the application of heat), and may be doubled on itself without cracking or breaking. It can be cut or stamped into various forms and may be employed as a gasket or in various other ways. It is, of course, waterproof. If desired, the composition may be spread upon a backing or foundation of woven or felted material by suitable heated rolls.

The aqueous paste, which is added to the mixture of asphalt and Portland cement, furnishes sufficient water to react with the Portland cement in the mixture, so that all of the Portland cement is caused to set throughout the body of the final composition.

What I claim is:

1. A composition of matter which is pliable, water-repellent and relatively nonadhesive at ordinary temperatures, and which comprises asphalt, clay and Portland cement.

2. A composition of matter which is pliable, water-repellent and relatively nonadhesive at ordinary temperatures, and which comprises asphalt, clay, Portland cement and a fibrous material, all in intimate admixture.

3. A composition of matter which is pliable, water-repellent and relatively nonadhesive at ordinary temperatures, and which comprises asphalt, clay, Portland cement, cotton fiber and sawdust, all in intimate admixture.

4. A composition of matter which is pliable, water-repellent and relatively nonadhesive at ordinary temperatures, and which comprises asphalt, clay and Portland cement in the proportions of about 600 parts asphalt, about 350 parts Portland cement, and about 50 parts clay.

5. A composition of matter which is pliable, water-repellent and relatively nonadhesive at ordinary temperatures, and which comprises asphalt, clay, Portland cement and a fibrous material, all in intimate admixture, in the proportions of about 600 parts asphalt, about 350 parts Portland cement, about 50 parts clay and about 400 parts fibrous material.

6. A composition of matter which is pliable, water-repellent and relatively nonadhesive at ordinary temperatures, and which comprises asphalt, clay, Portland cement, cotton fiber and sawdust, all in intimate admixture, in the proportions of about 600 parts asphalt, about 350 parts Portland cement, about 50 parts clay, about 300 parts cotton fiber, and about 100 parts sawdust.

7. The herein described process which comprises mixing dry Portland cement and molten asphalt, and incorporating in such mixture an aqueous paste of Portland cement and clay.

8. The herein described process which comprises mixing dry Portland cement and molten asphalt, incorporating in such mixture an aqueous paste of Portland cement, clay and a fibrous material.

9. The herein described process which comprises mixing dry Portland cement and molten asphalt, incorporating in such mixture an aqueous paste of Portland cement and clay, and finally distributing finely divided sawdust and cotton fiber throughout the product.

In testimony whereof I have affixed my signature.

ALBERT L. CLAPP.